(12) United States Patent
Chandraker et al.

(10) Patent No.: US 9,821,813 B2
(45) Date of Patent: Nov. 21, 2017

(54) CONTINUOUS OCCLUSION MODELS FOR ROAD SCENE UNDERSTANDING (71) Applicant: NEC Laboratories America, Inc., Princeton, NJ (US)

(72) Inventors: Manmohan Chandraker, Santa Clara, CA (US); Vikas Dhiman, Buffalo, NY (US)

(73) Assignee: NEC Corporation, Tokyo (JP)

( * ) Notice: Subject to any disclaimer, the term of this patent is extended or adjusted under 35 U.S.C. 154(b) by 16 days.

(21) Appl. No.: 14/879,264

(22) Filed: Oct. 9, 2015

(65) Prior Publication Data
US 2016/0137206 A1    May 19, 2016

Related U.S. Application Data (60) Provisional application No. 62/079,268, filed on Nov. 13, 2014, provisional application No. 62/151,097, filed on Apr. 22, 2015.

(51) Int. Cl.
B60W 40/04    (2006.01)
G06T 17/00    (2006.01)
(Continued)

(52) U.S. Cl.
CPC .......... B60W 40/04 (2013.01); G06K 9/00798 (2013.01); G06K 9/00805 (2013.01); G06T 7/215 (2017.01); G06T 7/277 (2017.01); G06T 7/579 (2017.01); G06T 17/00 (2013.01); B60R 2300/108 (2013.01); B60R 2300/804 (2013.01);
(Continued)

(58) Field of Classification Search
CPC ........ B60R 2300/108; B60R 2300/804; H04N 5/225; G06T 2207/10016; G06T 17/00; G06T 2207/30252; G06T 7/2006; G06T 7/0071; G06T 7/208; B60W 40/04; G06K 9/00798
See application file for complete search history.

(56) References Cited

U.S. PATENT DOCUMENTS 8,698,799 B2 * 4/2014 Miller ................. G06T 15/40
345/419
8,880,273 B1   11/2014 Chatham
(Continued)

FOREIGN PATENT DOCUMENTS

EP    002525303 A1 * 11/2012

OTHER PUBLICATIONS

Kundu et al, Realtime Multibody Visual SLAM with a Smoothly Moving Monocular Camera (2013).
(Continued)

Primary Examiner — Sean Conner
Assistant Examiner — Pinalben Patel
(74) Attorney, Agent, or Firm — Jospeh Kolodka (57) ABSTRACT Systems and methods are disclosed for road scene understanding of vehicles in traffic by capturing images of traffic with a camera coupled to a vehicle; generating a continuous model of occlusions with a continuous occlusion mode for traffic participants to enhance point track association accuracy without distinguishing between moving and static objects; applying the continuous occlusion model to handle visibility constraints in object tracks; and combining point track association and soft object track modeling to improve 3D localization accuracy.

15 Claims, 9 Drawing Sheets (51) Int. Cl.
    *H04N 7/18* (2006.01)
    *H04N 5/225* (2006.01)
    *G06T 7/20* (2017.01)
    *G06K 9/00* (2006.01)
    *G06T 7/579* (2017.01)
    *G06T 7/215* (2017.01)
    *G06T 7/277* (2017.01)

(52) U.S. Cl.
    CPC ............... *G06T 2207/10016* (2013.01); *G06T 2207/30252* (2013.01); *H04N 5/225* (2013.01); *H04N 7/183* (2013.01)

(56) References Cited

U.S. PATENT DOCUMENTS

2006/0028474 A1* 2/2006 Pfister .................... G06T 15/50
                                                        345/473
2010/0305857 A1* 12/2010 Byrne ................... G06T 7/0042
                                                        701/301
2015/0030219 A1* 1/2015 Madabhushi ......... G06T 7/0083
                                                        382/128

OTHER PUBLICATIONS

Zia et al, Explicit Occlusion Modeling for 3D Object Class Representations, IEEE Conf on Computer Vision and Pattern Recognition (2013).

* cited by examiner

FIG. 1

Continuous Occlusion Model for Traffic Participants    100

Regions occupied by an object are more opaque, while free space is more transparent.

Objects are modeled as translucent 3D ellipsoids with maximum opacity at center:

$$f_{occ}(x) = \mathcal{L}(x; p, \Sigma) \quad (5)$$

where $\mathcal{L}(\cdot)$ is the logistic function given by $$\mathcal{L}(x; p, \Sigma) = \frac{1}{1 + e^{-k(1-d(x,p))}}, \quad (6)$$

with $d(x, p) = (x - p)^T \Sigma (x - p)$ being the Mahalanobis distance. We set $k = 10 \ln 49$ as the value that allows the logistic function $\mathcal{L}$ to drop to 0.98 at a distance $d = 0.9$ from the object center. The spread of the ellipsoid, determined by $\Sigma_i$, depends of the dimensions of the traffic participant.

Reflection Probability 102

Reflection probability Consider a 3D point $x_j$ observed in the image at pixel $u_j$. Let $\hat{r}_j = \frac{K^{-1}u_j}{\|K^{-1}u_j\|}$ be the corresponding unit vector along the backprojected ray from the camera center. Then, the probability of reflection at depth $\lambda$ along the ray $\hat{r}_j$, by an object $O_i$, is determined by the object's gradient of the occupancy function $f_{occ}^i$:

$$P_{reflection}^{ij}(\lambda) = (\max\{0, \nabla f_{occ}^i(x_j)^T \hat{r}_j\})^2 \quad (8)$$

Object Tracks Energy with Occlusion Modeling 300

Model object detection scores as a sum of Gaussians:

$$S(\mathbf{d}^i(t)) = \sum_k A_k \exp(-(\mathbf{d}^i(t) - \mu_k^{(d)})^T \Sigma_k^{(d)-1}(\mathbf{d}^i(t) - \mu_k^{(d)}))$$

Model detection scores with occlusions:

$$S'(\mathbf{d}^i(t)) = \sum_j A_j \exp(-(\mathbf{d}^i(t) - \mu_j^{(d)})^T \Sigma_j^{(d)-1}(\mathbf{d}^i(t) - \mu_j^{(d)}))$$

with $$\mathcal{E}_{data}^{i}(\{\Omega^i(t)\}_i, \{\Omega^i(t-1)\}_i, \{\mathbf{B}^i\}_i) = \frac{1}{S'(\mathbf{d}^i(t))}$$

$$\rho_j = O_j(\mathbf{u}, \mu_j^{(j)}) \qquad O_i(\mathbf{u}, \mu_j^{(j)}) = 1 - P_{occlusion}^{(i)}(\mu_j^{(j)})$$

Occlusion aware object tracks energy:

$$\mathcal{E}_{data}^{i}(\{\Omega^i(t)\}_i, \{\Omega^i(t-1)\}_i, \{\mathbf{B}^i\}_i) = \frac{1}{S'(\mathbf{d}^i(t))}$$

CONTINUOUS OCCLUSION MODELS FOR ROAD SCENE UNDERSTANDING

This application claims priority to Provision Applications 62/079,268 filed Nov. 13, 2014 and 62/151,097 filed Apr. 22, 2015, the content of each is incorporated by reference.

BACKGROUND

The present application relates to road scene understanding.

One of the central goals of 3D scene understanding is to localize the 3D positions and orientations of objects in complex scenes. For instance, using stereo imagery, several visual cues are combined to simultaneously determine object locations and a rough intersection topology. 3D localization in road scenes from the monocular video is an important problem for applications in autonomous driving. Conventional systems have also considered monocular frameworks. Notably, occlusions are handled by considering partial object detectors. A detailed part-based representation of objects based on annotated CAD models has been used for monocular scene understanding, which also allows reasoning about mutual occlusions between objects.

SUMMARY

In one aspect, systems and methods are disclosed for road scene understanding of vehicles in traffic by capturing images of traffic with a camera coupled to a vehicle; generating a continuous model of occlusions with a continuous occlusion mode for traffic participants to enhance point track association accuracy without distinguishing between moving and static objects; applying the continuous occlusion model to handle visibility constraints in object tracks; and combining point track association and soft object track modeling to improve 3D localization accuracy.

In another aspect, a probabilistic graphical model-based system is used to estimate 3D localization of traffic participants in road scenes. The system uses object detections, point tracks, egomotion, estimated ground truth, GPS and map information as input. Given the input, the system determines 6DOF 3D localization of traffic participants along with their dimensions (height, width and length). The soft occlusion models are processed where a region in space is viewed in terms of reflection and transmission probability. We test and train our model on KITTI dataset and show that our occlusion model works better than the baseline method of bounding boxes. We also show that our 3D localization results with monocular video input are comparable to (Geiger 2014) which uses stereo input.

Advantages of the system may include one or more of the following. The monocular framework uses a physical modeling of occlusion in continuous space, which makes it more general, extensible and amenable to continuous optimization. The system is more accurate since it can accurately handle occlusions that are usually ignored. The system is practical and extensible since it does not require expensive training. The system is fast since it does not require complex inference in discrete frameworks. The motion segmentation for point tracks association can also handle static objects

DESCRIPTION

Figure 1:
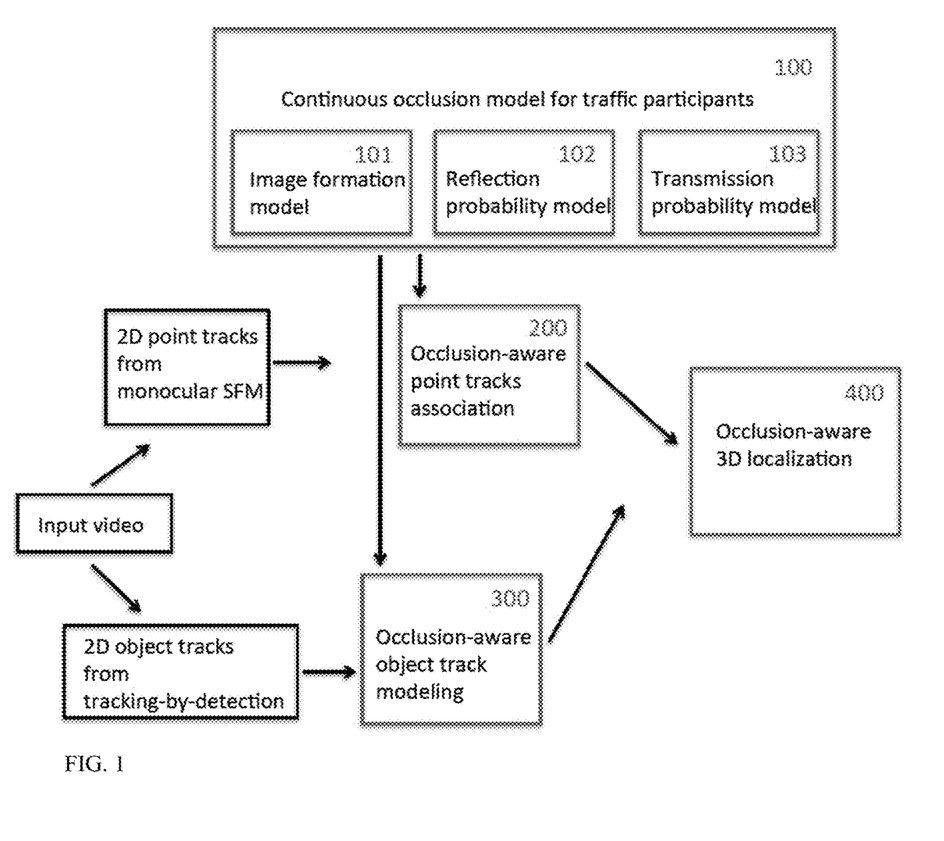
FIG. 1 shows an exemplary system for handling occlusions in 3D localization of objects such as cars for road scene understanding applications.

FIG. 1 shows an exemplary system for handling occlusions in 3D localization of objects such as cars for road scene understanding applications. The system uses a continuous occlusion model engine for traffic participants 100 with an image formation model engine 101, a reflection probability model engine 102, and a transmission probability model engine 103. Details on the continuous occlusion model engine 100 and its components are discussed in depth below.

Input video captured by a vehicle's on-board camera is provided to 2D object tracking modules, one for 2D point tracking from monocular SFM and one for 2D object tracking by detection. The 2D point tracking provides information to an occlusion aware point track association unit 200, while the 2D object tracking drives an occlusion aware object track modeling unit 300. Units 200 and 300 receive data from continuous occlusion model engine for traffic participants 100. The outputs of units 200 and 300 are provided to an occlusion aware 3D localization 400.

The system provides an entirely continuous model of occlusions for traffic participants. The continuous occlusion mode is used to enhance the accuracy of point track associations without the need to distinguish between moving and static objects. The continuous occlusion model handles visibility constraints in object tracks. Point track association and soft object track modeling are combined to improve 3D localization. Physical insights are used to model occlusion relationships including:

(a) an occupancy model engine for traffic participants (TPs) that treats them as translucent objects, reflected by an occupancy function.
(b) a reflection model engine for handling visible points.
(c) a transmission model engine for representing occlusions from all other TPs in the scene.
(d) the above model engines are used to determine soft assignments of point tracks to TPs.
(e) the above model engines account for occlusion relationships in object detection scores.
(f) 3D localization using the energies from the above point tracks and detection model engines, along with energies that incorporate transition and collision constraints.

Figure 2:
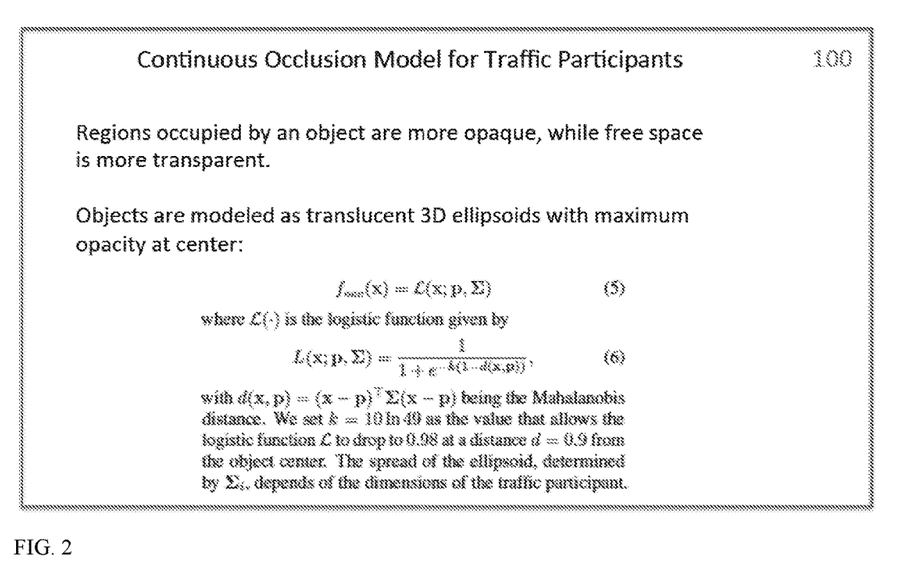
FIG. 2 shows an exemplary continuous occlusion model for traffic participants.

FIG. 2 shows an exemplary continuous occlusion model engine 100 for traffic participants. The occlusion model engine is defined for TPs treating objects as translucent entities.

Figure 3:
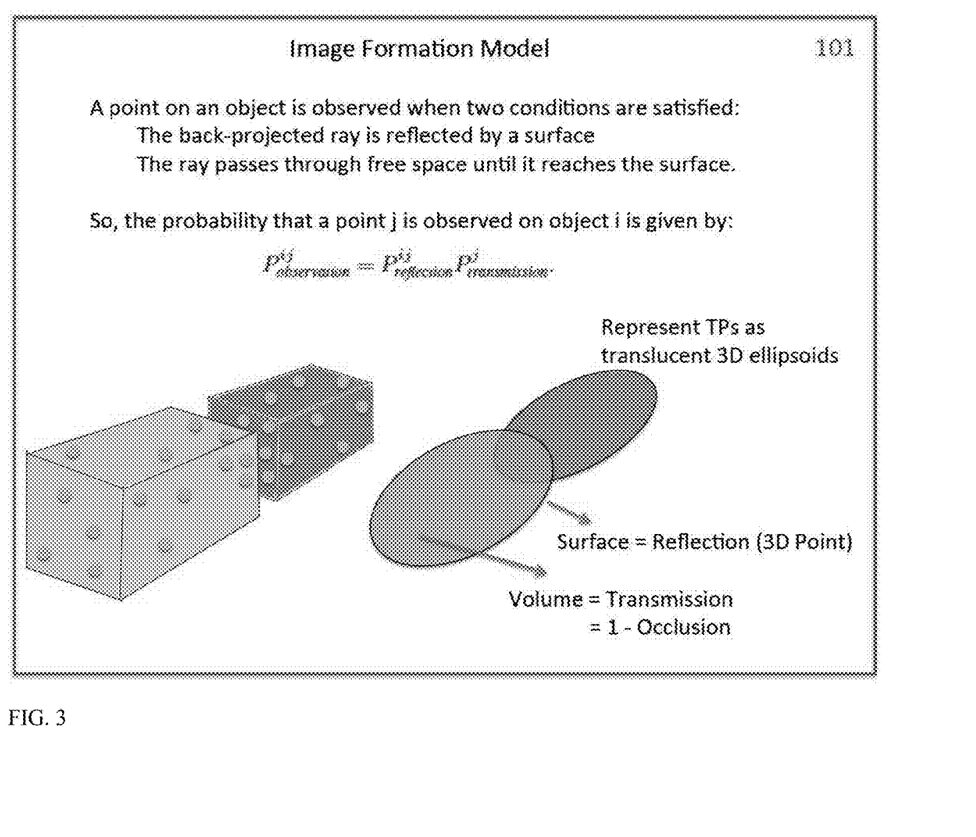
FIG. 3 shows an exemplary image formation model engine.

FIG. 3 shows an exemplary an image formation model engine 101 that accounts for reflection and transmission as a soft way to model occlusions.

Figure 4:
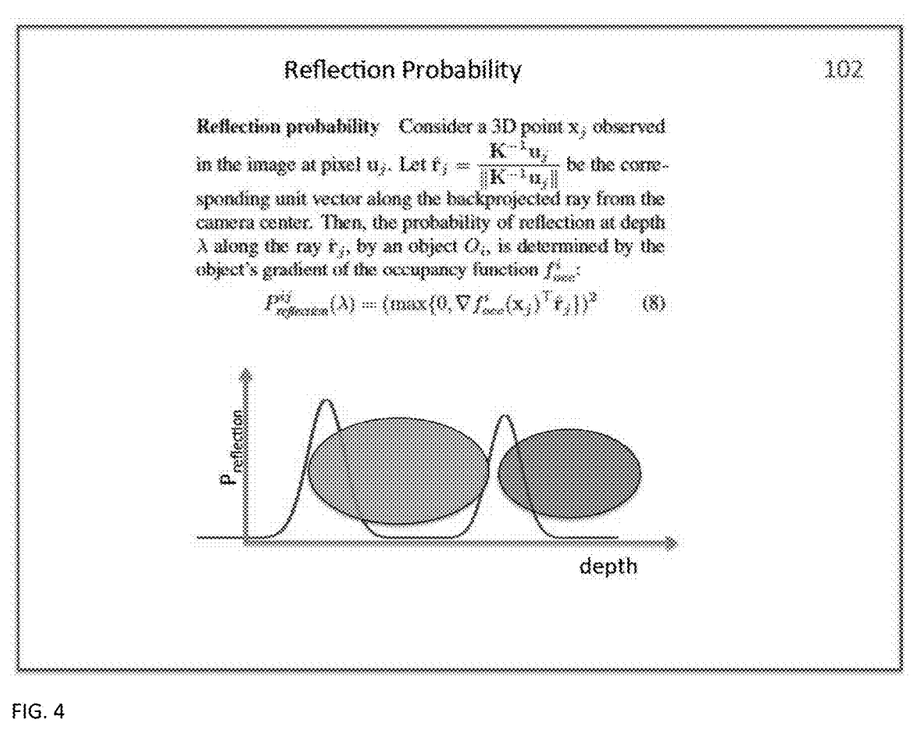
FIG. 4 shows an exemplary reflection probability model engine that determines when a point is visible in the image.

FIG. 4 shows an exemplary reflection probability model engine 102 that determines when a point is visible in the image.

Figure 5:
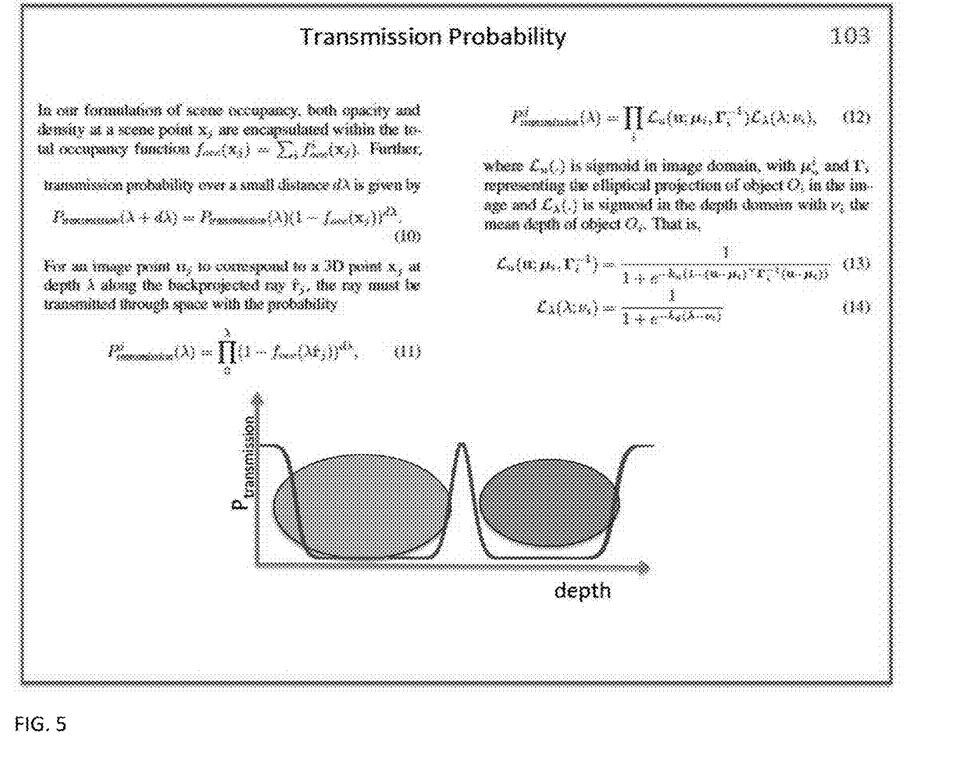
FIG. 5 shows an exemplary transmission probability model engine to deal with occlusions due to intermediate objects in the path of a back-projected ray.

FIG. 5 shows an exemplary transmission probability model engine 103 with a soft way to deal with occlusions due to intermediate objects in the path of a back-projected ray.

Figure 6:
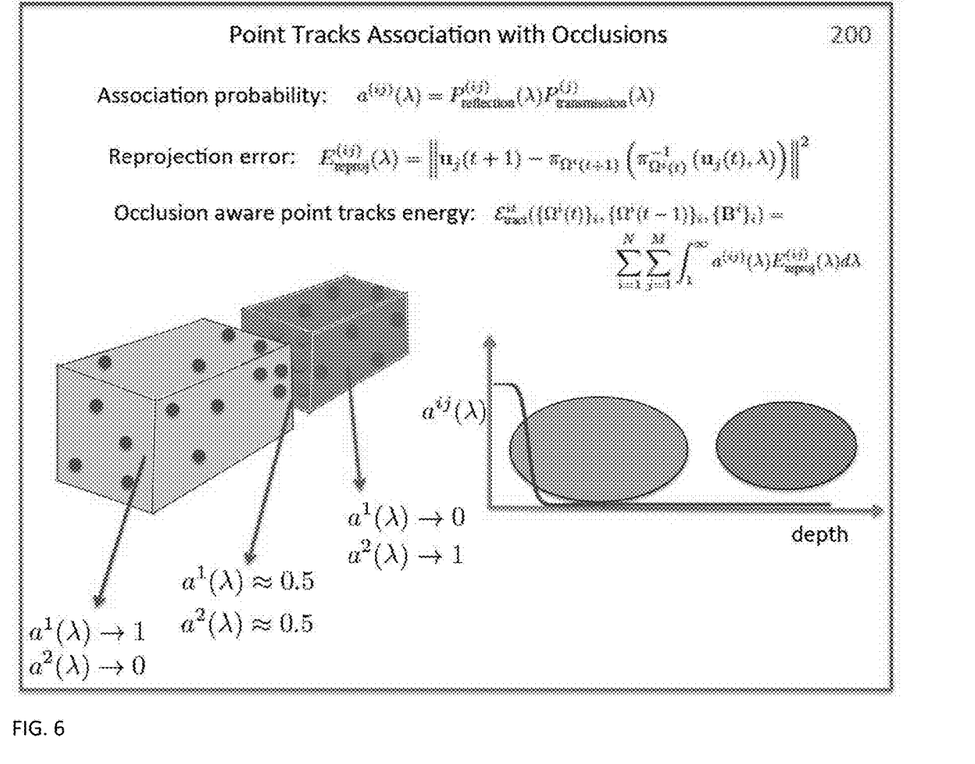
FIG. 6 shows an exemplary point tracks association energy that can assign points in a soft fashion to various traffic participants (TPs).

FIG. 6 shows an exemplary point tracks association energy 200 that can assign points in a soft fashion to various TPs.

Figure 7:
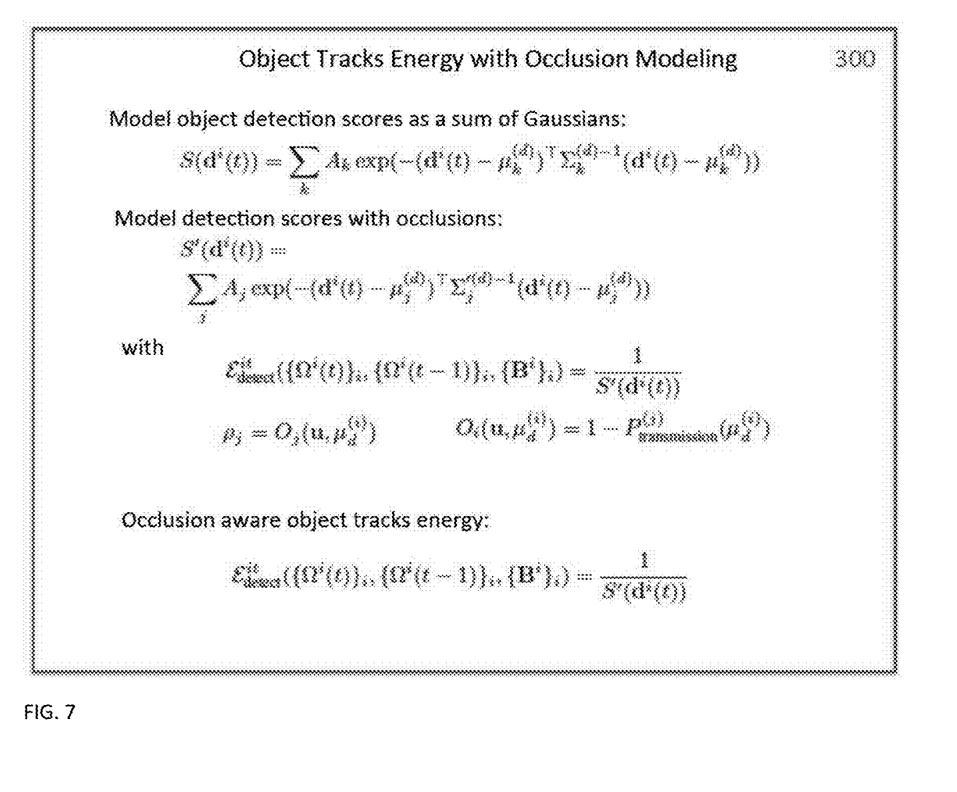
FIG. 7 shows an exemplary object tracks energy that can probabilistically adjust detection bounding boxes and scores to account for occlusions.

FIG. 7 shows an exemplary object tracks energy 300 that can probabilistically adjust detection bounding boxes and scores to account for occlusions.

Figure 8:
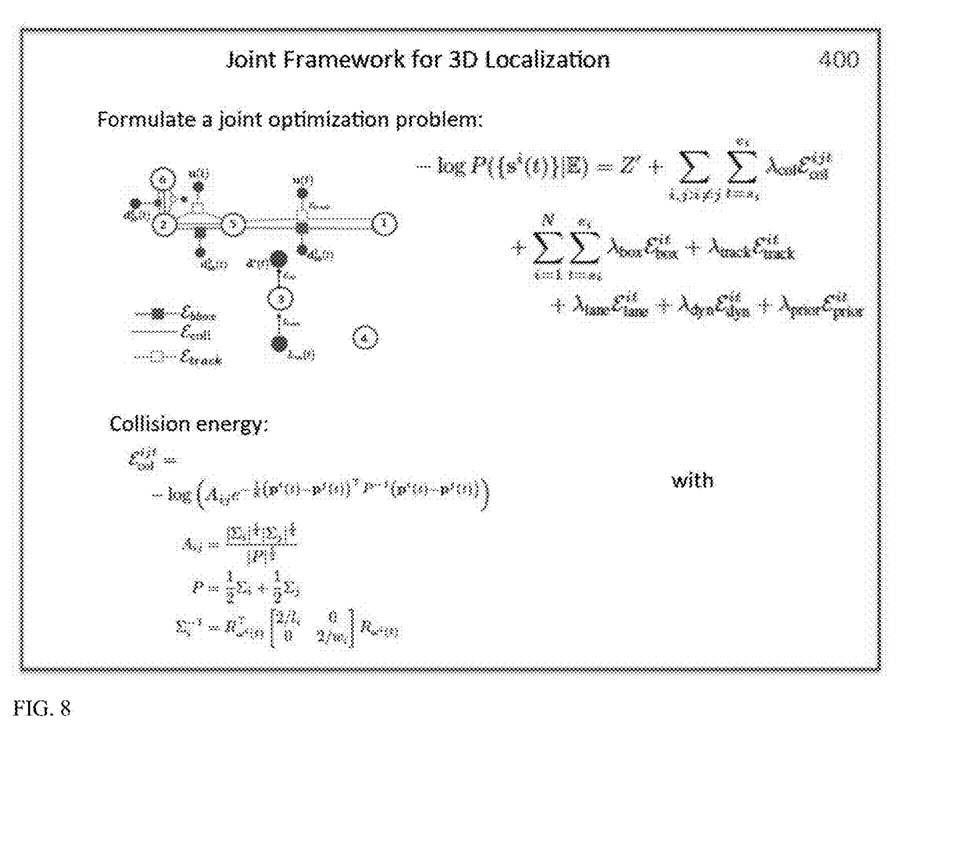
FIG. 8 shows an exemplary localization framework that combines the above energies along with other energies such as collision and transition energies, along with size priors.

FIG. 8 shows an exemplary localization framework 400 that combines the above energies along with other energies such as collision and transition energies, along with size priors.

Details of FIGS. 2-8 are discussed below.

Motion Segmentation and Multibody SFM

An application for our occlusion modeling is to determine point track associations in scenes with multiple objects. For moving objects, this is within the purview of motion segmentation. This also motivates further applications such as object segmentation based on point trajectories. Motion segmentation is also used within multibody structure from motion (SFM) frameworks. Our system does not distinguish between moving and static objects and also explicit reasons about occlusions due to 3D object geometries for associating point tracks to individual objects.

The Model Engine

Next is a detailed description of our motion segmentation, where the following notations are used:

| Symbol | Meaning |
| --- | --- |
| $p^i(t)$ | Position of i th car at time t |
| $\omega^i(t)$ | Orientation of i th car at time t |
| $B^i$ | 3D bounding box of the car (dimensions) |
| $s^i(t)$ | State of car = $\{p^i(t), \omega^i(t), B^i\}$ |
| $p^c(t)$ | Position of camera at time t |
| $\omega^c(t)$ | Orientation of camera at time t |
| $\Omega^i(t)$ | Relative car pose w.r.t. camera |
| $X_o^{(i)}$ | 3D points tracked on car i in its own frame |
| $u^{(i)}(t)$ | Projection of $X_o^{(i)}$ in camera |
| $\pi_{\Omega^i(t)}(.)$ | Projection function for pose $\Omega^i(t)$ |
| $d^i(t)$ | 2D bounding box of the car in image |

The objective is to find the most likely traffic participant (TP) state given various evidence $E=\{\{u^{(i)}(t)\}, \{d^i(t)\}, \text{lane-det., map, GPS}\}$.

Mathematically, find:

$$\{s^i(t)\}^* = \arg\max P(\{s^i(t)\}|E) \quad (1)$$

Bayes Rule $$P(\{s^i(t)\}|E) = \frac{1}{Z} P(E|\{s^i(t)\}) P(\{s^i(t)\}) \quad (2)$$

Assume conditional independence according to graphical model in 1.

$$P(\{s^i(t)\}|E) = \frac{1}{Z} \prod_{t=s_i}^{e_i} \prod_{i,j:i \neq j} (P(s^i(t), s^j(t))) \quad (3)$$

$$\prod_{i=1}^{N} \prod_{t=s_i}^{e_i} P(d^i(t)|s^i(t)) P(u^{(i)}(t)|s^i(t))$$

$$P(s^i(t)|L_m(t)) P(s^i(t)|s^i(t-1)) P(s^i(t))$$

We can formulate similar objective function in negative log domain:

$$-\log P(\{s^i(t)\}|E) = Z' + \sum_{i,j:i \neq j} \sum_{t=s_i}^{e_i} \lambda_{col} E_{col}^{ijt} + \sum_{i=1}^{N} \sum_{t=s_i}^{e_i} \lambda_{box} E_{box}^{it} + \quad (4)$$

$$\lambda_{track} E_{track}^{it} + \lambda_{lane} E_{lane}^{it} + \lambda_{dyn} E_{dyn}^{it} + \lambda_{prior} E_{prior}^{it}$$

Occupancy Model for Traffic Participants

Intuitively, we consider traffic participants to be regions of 3D space with a high probability of occupancy. We model the uncertainty in occupancy as a translucency function, with regions more likely to be occupied by an object considered more opaque, while regions more likely to be free space are more transparent. Based on this intuition, we model objects as translucent 3D ellipsoids whose opacity is maximum at the center and falls off towards the edges. In particular, we model the occupancy at location x corresponding to a traffic participant-centered at p as:

$$f_{occ}(x) = L(x; p, \Sigma) \quad (5)$$

where $L(.)$ is the logistic function given by $$L(x; p, \Sigma) = \frac{1}{1 + e^{-k(1 - d(x,p))}}, \quad (6)$$

with $d(x,p) = (x-p)^T \Sigma (x-p)$ being the Mahalanobis distance. We set as the value that allows the logistic function to drop to at a distance from the object center. The spread of the ellipsoid, determined by $\Sigma_i$, depends on the dimensions of the traffic participant. Please refer to the additional material for computation of from object dimensions.

Image Formation

Given the above occupancy representation of the scene, a point on an object is observed in the camera when precisely two conditions are satisfied. First, the back projected ray from the observed image pixel is transmitted through free space until it reaches the object. Second, the ray encounters an opaque enough object surface and is reflected. More formally, the probability of observation of a point $x_j$ on object $O_i$ is given by $$P_{observation}^{ij} = P_{reflection}^{ij} P_{transmission}^{j} \quad (7)$$

The reflection probability ensures the presence of an object to constitute the observation, while the transmission probability allows us to model occlusions. The forms of these two functions are described next.

Reflection Probability

Consider a 3D point observed in the image at the pixel $u_j$. Let $$\hat{r}_j = \frac{K^{-1} u_j}{\|K^{-1} u_j\|}$$

be the corresponding unit vector along the back projected ray from the camera center. Then, the probability of reflection at depth $\lambda$ along the ray $\hat{r}_j$, by an object $O_i$, is determined by the object's gradient of the occupancy function $f_{occ}^i$:

$$P_{reflection}^{ij}(\lambda) = (\max\{0, \nabla f_{occ}^i(x_j)^T \hat{r}_j\})^2 \quad (8)$$

The max{ } ensures that the negative probability due to the gradient in the direction opposite to ray is clipped off and squaring the function allows it to be smooth near zero. We note that in the extreme case of an opaque object, the above reverts to a (squared) Lambertian reflection.

Transmission Probability

A model engine for transmission of light through a material of thickness $\alpha$, density $\rho$ and opacity $\beta$ is given by the Beer-Lambert Law:

$$I(x) = I_0 e^{-\beta \rho \alpha}. \quad (9)$$

In our formulation of scene occupancy, both opacity and density at a scene point are encapsulated within the total occupancy function $f_{occ}(x_j) = \Sigma_i f_{occ}^i(x_j)$. Further, the domain of our occupancy function is $[0,1]$ instead of for opacity $\beta$. Thus, we replace $e^{-\beta \rho}$ by the transparency function $1-f_{occ}(x_j)$ and consequently, the transmission probability over a small distance $d\lambda$ is given by $$P_{transmission}(\lambda + d\lambda) = P_{transmission}(\lambda)(1 - f_{occ}(x_j))^{d\lambda} \quad (10)$$

For an image point $u_j$ to correspond to a 3D point $x_j$ at depth $\lambda$ along the backprojected ray $\hat{r}_j$, the ray must be transmitted through space with the probability $$P_{transmission}^j(\lambda) = \prod_0^\lambda (1 - f_{occ}(\lambda \hat{r}_j))^{d\lambda}, \text{ where} \quad (11)$$

$\prod_0^\lambda$ represents the product integral from 0 to $\lambda$.[1]

In practice, the integral for transmission probability (11) is difficult to compute even numerically. So we choose a parameterization in the form of a product of sigmoid functions, which is a reasonable approximation to the behavior of the transmission probability:

$$P_{transmission}^j(\lambda) = \prod_i L_u(u; \mu_i, \Gamma_i^{-1}) L_\lambda(\lambda; v_i), \quad (12)$$

where $L_u(.)$ is sigmoid in image domain, with $\mu_u^i$ and $\Gamma_i$ representing the elliptical projection of object $O_i$ in the image and $L_\lambda(.)$ is sigmoid in the depth domain with $v_i$ the mean depth of object $O_i$. That is, $$L_u(u; \mu_i, \Gamma_i^{-1}) = \frac{1}{1 + e^{-k_u(1-(u-\mu_i)^T \Gamma_i^{-1}(u-\mu_i))}} \quad (13)$$

$$L_\lambda(\lambda; v_i) = \frac{1}{1 + e^{-k_d(\lambda - v_i)}} \quad (14)$$

Thus, we have modeled the transmission probability to capture effectively the effect of occlusion due to all traffic participants in a scene that lie along a particular ray. We reiterate that our reflection and transmission probabilities are continuous functions, which allows us to define continuous energy functions for association and 3D object localization, as described in the next section.

Next, we will discuss continuous energies for Object Localization

Point Tracks Energy with Occlusion

We model continuous point tracks energy with explicit occlusion reasoning as the expected re-projection error over the association probability,

[1] A product integral is a simple integral in log domain:

$$\prod_0^\lambda (1 - f_{occ}(\lambda \hat{r}_j))^{d\lambda} = e^{\int_1^\lambda \ln(1 - f_{occ}(\lambda \hat{r}_j)) d\lambda}.$$

$$E_{tract}^{it}(\{\Omega^i(t)\}_i, \{\Omega^i(t-1)\}_i, \{B^i\}_i) = \sum_{i=1}^N \sum_{j=1}^M \int_1^\infty a^{(ij)}(\lambda) E_{reproj}^{(ij)}(\lambda) d\lambda \quad (15)$$

where $\alpha^{(ij)(\lambda)}$ is the association probability of jth point with ith TP at depth $\lambda$ and $E_{reproj}^{(ij)}(\lambda)$ is the re-projection error given by $$\alpha^{(ij)}(\lambda) = P_{reflection}^{(ij)}(\lambda) P_{transmission}^{(j)}(\lambda) \quad (16)$$

$$E_{reproj}^{(ij)}(\lambda) = \|u_j(t+1) - \pi_{\Omega^i(t+1)}(\pi_{\Omega^i(t)}^{-1}(u_j(t), \lambda))\|^2. \quad (17)$$

The $\pi_{\Omega^i(t)}(.)$ and $\pi_{\Omega^i(t)}^{-1}(.)$ denote the projection and inverse projection functions that project 3D point to camera image and vice versa. Note that inverse projection $\pi_{\Omega^i(t)}^{-1}(.)$ depend on both the point $u^{(i)}(t)$ and the unknown depth $\lambda$. Also note that the inverse projection is dependent on TP pose at time t while the projection depends on pose at time t+1 which can be different.

Object Detection Energy with Occlusion

Object detection is usually followed by non-maximal suppression that results in discarding similar bounding boxes. When we are jointly optimizing detections with other cues, it is not usually desirable to go with a single bounding box. Hence, we keep all the bounding box detections by approximating them with the multi-modal sum of Gaussian-like logistic functions. We fit the parametric function of the form $$S(d^i(t)) = \sum_k A_k \exp\left(-\left(d^i(t) - \mu_k^{(d)}\right)^T \Sigma_k^{(d)-1} \left(d^i(t) - \mu_k^{(d)}\right)\right) \quad (18)$$

to detection scores, by non-linear error minimization with initialization from non-maximal suppressed outputs. Here $\mu_j^{(d)}$ is one of the k modes as a 4D vector representing a single bounding box as $[x_{min}, y_{min}, x_{max}, y_{max}]^T$. The optimization is constrained by symmetry and positive definiteness of $\Sigma_k^{(d)-1}$, $x_{max} \geq x_{min}$ and $y_{max} \geq y_{min}$.

Detection Scores with Occlusion Reasoning

With our model of $P_{transmission}^{(j)}(\lambda)$ described in Section 4, we can compute the probability of a point u on image be occluded assuming the point is on TP i with mean depth $\mu_d^{(i)}$ as $$O_i(u, \mu_d^{(i)}) = 1 - P_{transmission}^{(j)}(\mu_d^{(i)}). \quad (19)$$

If we a portion of our proposed detection bounding box is known to be occluded, then we would like to decrease the confidence in the detection score about the localization of that end of the object. Assuming that the occlusion is often on the boundary of detection bounding boxes, we want to decrease our confidence on the mean detection boundaries around the occluded boundaries. One of the simplest ways will be to scale the appropriate diagonal element of $\Sigma_j$ by an appropriate scaling factor proportional to occlusion. But this does not model appropriate how does occlusion affects the non-diagonal terms. Hence, we choose a covariance addition model where we compute an occlusion covariance matrix, which provides a measure of occlusion in each direction.

To remodel our detection scores scaled by continuous occlusion we sample $O_i(u, \mu_d^{(i)})$ at the hypothesized detection boundaries from GMM $S(\,.\,)$ and we augment the detection boundary covariance matrix by $P_j = \rho_j \rho_j^T$ where $\rho_j = O_j(u, \mu_d^{(i)})$. The new covariance matrix in detection score is given by $$\Sigma_j'^{(d)} = P_j + \Sigma_j^{(d)}. \tag{20}$$

The detection scores GMM with occlusion is given by replacing the covariance matrix $$S'(d^i(t)) = \sum_j A_j \exp\left(-(d^i(t) - \mu_j^{(d)})^T \Sigma_j'^{(d)-1} (d^i(t) - \mu_j^{(d)})\right) \tag{21}$$

The energy of detection scores is simply taken to be the inverse of the detection score.

$$E_{detect}^{it}(\{\Omega^i(t)\}_i, \{\Omega^i(t-1)\}_i, \{B^i\}_i) = \frac{1}{S'(d^i(t))} \tag{22}$$

Lane Energy

The lanes are modeled as splines. Here we assume that the confidence in lane detection is decreased as the distance from the lane center increases. The energy is given by the dot product between car orientation and tangent to the lane at that point.

$$E_{lane}^{it} = \sum_{m \in M_{close}} (1 - \omega^i(t) \cdot \text{TAN}(L_m(k), p^i(t))) \Sigma_{L_m}(p^i(t)) \tag{23}$$

where $M_{close} = \{m : \text{DIST}(L_m(k), p^i(t)) < 50\}$ is the set of nearby lanes and $$\Sigma_{L_m}(p^i(t)) = \frac{1}{1 + \exp(-q(w_{road} - \text{DIST}(L_m(k), p^i(t))))} \tag{24}$$

for some constant that represents the width of the road.

Transition Probability

Dynamics constraints should enforce not only smooth trajectories but also the holonomic constraints. The following energy adds a penalty if the change in position is not in the direction of previous orientation.

$$E_{dyn-hol}^{it} = 1 - \omega^i(t-1) \cdot (p^i(t) - p^i(t-1)) \tag{25}$$

The following energy adds a penalty for change in position and orientation, but a penalty for change in velocity is a much better approximation. However, in a Markovian setting that would mean extending the state space of the car to include velocity.

$$E_{dyn-ori}^{it} = P\omega^i(t) - \omega^i(t-1)P^2 \tag{26}$$

$$E_{dyn-vel}^{it} = P(p^i(t) - 2p^i(t-1)) + p^i(t-2)P^2 \tag{27}$$

As a result, the dynamics are modeled by a weighted combination of holonomic constraint and smoothness constraints.

$$\lambda_{dyn} E_{dyn}^{it} = \lambda_{dyn-hol} E_{dyn-hol}^{it} + \lambda_{dyn-ori} E_{dyn-ori}^{it} + \lambda_{dyn-vel} E_{dyn-vel}^{it} \tag{28}$$

Collision Energy

Bhattacharya coefficient $\int_a^b \sqrt{p(x)q(x)} dx$ is a measure of similarity of two distributions and $q(x)$. If we represent TPs as Gaussians in Birds eye view (BEV), then the similarity is a measure of the collision. Exactly overlapping distribution results in coefficient as 1.

$$E_{col}^{ijt} = -\log\left(A_{ij} e^{-\frac{1}{8}(p^i(t) - p^j(t))^T P^{-1}(p^i(t) - p^j(t))}\right) \tag{29}$$

$$A_{ij} = \frac{|\Sigma_i|^{\frac{1}{4}} |\Sigma_j|^{\frac{1}{4}}}{|P|^{\frac{1}{2}}} \tag{30}$$

$$P = \frac{1}{2}\Sigma_i + \frac{1}{2}\Sigma_j \tag{31}$$

$$\Sigma_i^{-1} = R_{\omega^i(t)}^T \begin{bmatrix} 2/l_i & 0 \\ 0 & 2/w_i \end{bmatrix} R_{\omega^i(t)} \tag{32}$$

Size Prior

Prior can include among many other things the size prior on the car.

$$E_{prior}^{it} = (B^i - \hat{B})^T \Sigma_{\hat{B}}^{-1} (B^i - \hat{B}) \tag{33}$$

where $\hat{B}$ is the mean TP dimensions and $\Sigma_{\hat{B}}$ is the correspondence covariance matrix.

Figure 9:
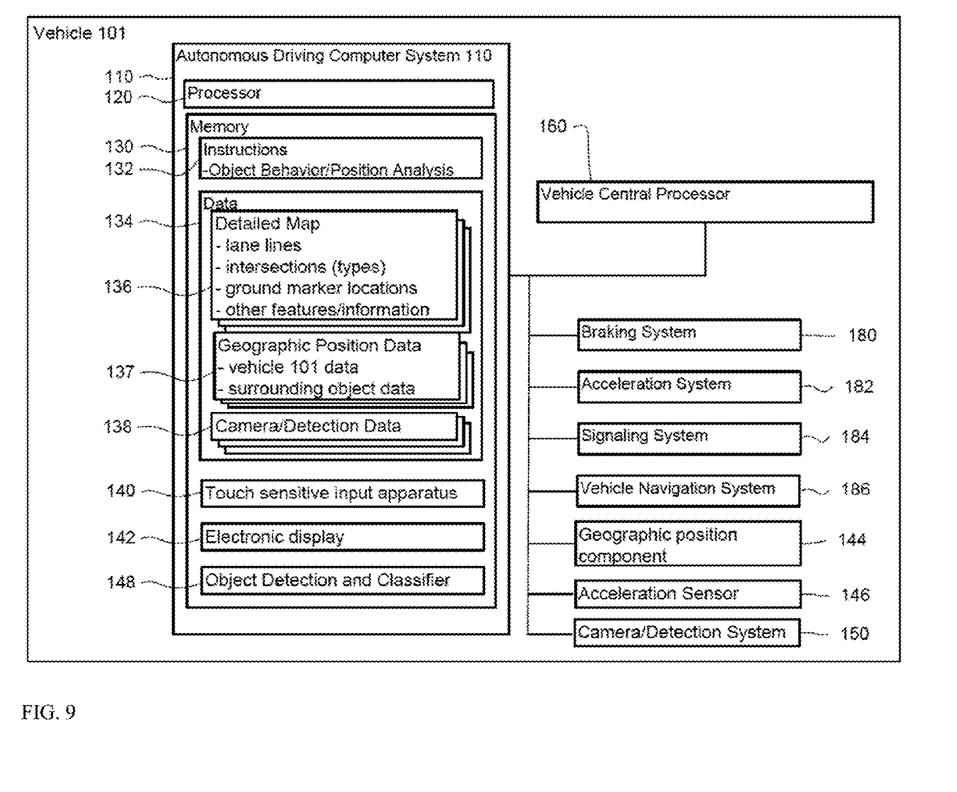
FIG. 9 shows an exemplary smart car.

As shown in FIG. 9, an autonomous driving system 100 in accordance with one aspect includes a vehicle 101 with various components. While certain aspects are particularly useful in connection with specific types of vehicles, the vehicle may be any type of vehicle including, but not limited to, cars, trucks, motorcycles, busses, boats, airplanes, helicopters, lawnmowers, recreational vehicles, amusement park vehicles, construction vehicles, farm equipment, trams, golf carts, trains, and trolleys. The vehicle may have one or more computers, such as computer 110 containing a processor 120, memory 130 and other components typically present in general purpose computers.

The memory 130 stores information accessible by processor 120, including instructions 132 and data 134 that may be executed or otherwise used by the processor 120. The memory 130 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as commercial CPUs. Alternatively, the processor may be a dedicated device such as an ASIC. Although FIG. 1 functionally illustrates the processor, memory, and other elements of computer 110 as being within the same block, it will be understood by those of ordinary skill in the art that the processor and memory may actually comprise multiple processors and memories that may or may not be stored within the same physical housing. For example, memory may be a hard drive or other storage media located in a housing different from that of computer 110. Accordingly, references to a processor or computer will be understood to include references to a collection of processors, computers or memories that may or may not operate in parallel. Rather than using a single processor to perform the steps described herein some of the components such as steering components and deceleration components may each have their own processor that only performs calculations related to the component's specific function.

In various aspects described herein, the processor may be located remotely from the vehicle and communicate with the vehicle wirelessly. In other aspects, some of the processes described herein are executed on a processor disposed within the vehicle and others by a remote processor, including taking the steps necessary to execute a single maneuver.

Computer 110 may include all of the components normally used in connection with a computer such as a central processing unit (CPU), memory (e.g., RAM and internal hard drives) storing data 134 and instructions such as a web browser, an electronic display 142 (e.g., a monitor having a screen, a small LCD touch-screen or any other electrical device that is operable to display information), user input (e.g., a mouse, keyboard, touch screen and/or microphone), as well as various sensors (e.g. a video camera) for gathering the explicit (e.g., a gesture) or implicit (e.g., "the person is asleep") information about the states and desires of a person.

The vehicle may also include a geographic position component 144 in communication with computer 110 for determining the geographic location of the device. For example, the position component may include a GPS receiver to determine the device's latitude, longitude and/or altitude position. Other location systems such as laser-based localization systems, inertia-aided GPS, or camera-based localization may also be used to identify the location of the vehicle. The vehicle may also receive location information from various sources and combine this information using various filters to identify a "best" estimate of the vehicle's location. For example, the vehicle may identify a number of location estimates including a map location, a GPS location, and an estimation of the vehicle's current location based on its change over time from a previous location. This information may be combined together to identify a highly accurate estimate of the vehicle's location. The "location" of the vehicle as discussed herein may include an absolute geographical location, such as latitude, longitude, and altitude as well as relative location information, such as location relative to other cars in the vicinity which can often be determined with less noise than absolute geographical location.

The device may also include other features in communication with computer 110, such as an accelerometer, gyroscope or another direction/speed detection device 146 to determine the direction and speed of the vehicle or changes thereto. By way of example only, device 146 may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the user, computer 110, other computers and combinations of the foregoing.

The computer may control the direction and speed of the vehicle by controlling various components. By way of example, if the vehicle is operating in a completely autonomous mode, computer 110 may cause the vehicle to accelerate (e.g., by increasing fuel or other energy provided to the engine), decelerate (e.g., by decreasing the fuel supplied to the engine or by applying brakes) and change direction (e.g., by turning the front wheels).

The vehicle may include components 148 for detecting objects external to the vehicle such as other vehicles, obstacles in the roadway, traffic signals, signs, trees, etc. The detection system may include lasers, sonar, radar, cameras or any other detection devices. For example, if the vehicle is a small passenger car, the car may include a laser mounted on the roof or other convenient location. In one aspect, the laser may measure the distance between the vehicle and the object surfaces facing the vehicle by spinning on its axis and changing its pitch. The laser may also be used to identify lane lines, for example, by distinguishing between the amount of light reflected or absorbed by the dark roadway and light lane lines. The vehicle may also include various radar detection units, such as those used for adaptive cruise control systems. The radar detection units may be located on the front and back of the car as well as on either side of the front bumper. In another example, a variety of cameras may be mounted on the car at distances from one another which are known so that the parallax from the different images may be used to compute the distance to various objects which are captured by one or more cameras, as exemplified by the camera of FIG. 1. These sensors allow the vehicle to understand and potentially respond to its environment in order to maximize safety for passengers as well as objects or people in the environment.

In addition to the sensors described above, the computer may also use input from sensors typical of non-autonomous vehicles. For example, these sensors may include tire pressure sensors, engine temperature sensors, brake heat sensors, brake pad status sensors, tire tread sensors, fuel sensors, oil level and quality sensors, air quality sensors (for detecting temperature, humidity, or particulates in the air), etc.

Many of these sensors provide data that is processed by the computer in real-time; that is, the sensors may continuously update their output to reflect the environment being sensed at or over a range of time, and continuously or as-demanded provide that updated output to the computer so that the computer can determine whether the vehicle's then-current direction or speed should be modified in response to the sensed environment.

These sensors may be used to identify, track and predict the movements of pedestrians, bicycles, other vehicles, or objects in the roadway. For example, the sensors may provide the location and shape information of objects surrounding the vehicle to computer 110, which in turn may identify the object as another vehicle. The object's current movement may be also be determined by the sensor (e.g., the component is a self-contained speed radar detector), or by the computer 110, based on information provided by the sensors (e.g., by comparing changes in the object's position data over time).

The computer may change the vehicle's current path and speed based on the presence of detected objects. For example, the vehicle may automatically slow down if its current speed is 50 mph and it detects, by using its cameras and using optical-character recognition, that it will shortly pass a sign indicating that the speed limit is 35 mph. Similarly, if the computer determines that an object is obstructing the intended path of the vehicle, it may maneuver the vehicle around the obstruction.

The vehicle's computer system may predict a detected object's expected movement. The computer system 110 may simply predict the object's future movement based solely on the object's instant direction, acceleration/deceleration and velocity, e.g., that the object's current direction and movement will continue.

Once an object is detected, the system may determine the type of the object, for example, a traffic cone, person, car, truck or bicycle, and use this information to predict the object's future behavior. For example, the vehicle may determine an object's type based on one or more of the shape of the object as determined by a laser, the size and speed of the object based on radar, or by pattern matching based on camera images. Objects may also be identified by using an object classifier which may consider one or more of the size of an object (bicycles are larger than a breadbox and smaller than a car), the speed of the object (bicycles do not tend to go faster than 40 miles per hour or slower than 0.1 miles per hour), the heat coming from the bicycle (bicycles tend to have a rider that emits body heat), etc.

In some examples, objects identified by the vehicle may not actually require the vehicle to alter its course. For example, during a sandstorm, the vehicle may detect the sand as one or more objects, but need not alter its trajectory, though it may slow or stop itself for safety reasons.

In another example, the scene external to the vehicle need not be segmented from input of the various sensors, nor do objects need to be classified for the vehicle to take a responsive action. Rather, the vehicle may take one or more actions based on the color and/or shape of an object.

The system may also rely on information that is independent of the detected object's movement to predict the object's next action. By way of example, if the vehicle determines that another object is a bicycle that is beginning to ascend a steep hill in front of the vehicle, the computer may predict that the bicycle will soon slow down—and will slow the vehicle down accordingly—regardless of whether the bicycle is currently traveling at a relatively high speed.

It will be understood that the foregoing methods of identifying, classifying, and reacting to objects external to the vehicle may be used alone or in any combination in order to increase the likelihood of avoiding a collision.

By way of further example, the system may determine that an object near the vehicle is another car in a turn-only lane (e.g., by analyzing image data that captures the other car, the lane the other car is in, and a painted left-turn arrow in the lane). In that regard, the system may predict that the other car may turn at the next intersection.

The computer may cause the vehicle to take particular actions in response to the predicted actions of the surrounding objects. For example, if the computer 110 determines that another car approaching the vehicle is turning, for example based on the car's turn signal or in which lane the car is, at the next intersection as noted above, the computer may slow the vehicle down as it approaches the intersection. In this regard, the predicted behavior of other objects is based not only on the type of object and its current trajectory, but also based on some likelihood that the object may or may not obey traffic rules or pre-determined behaviors. This may allow the vehicle not only to respond to legal and predictable behaviors, but also correct for unexpected behaviors by other drivers, such as illegal u-turns or lane changes, running red lights, etc.

In another example, the system may include a library of rules about object performance in various situations. For example, a car in a left-most lane that has a left-turn arrow mounted on the light will very likely turn left when the arrow turns green. The library may be built manually, or by the vehicle's observation of other vehicles (autonomous or not) on the roadway. The library may begin as a human-built set of rules which may be improved by vehicle observations. Similarly, the library may begin as rules learned from vehicle observation and have humans examine the rules and improve them manually. This observation and learning may be accomplished by, for example, tools and techniques of machine learning.

In addition to processing data provided by the various sensors, the computer may rely on environmental data that was obtained at a previous point in time and is expected to persist regardless of the vehicle's presence in the environment. For example, data 134 may include detailed map information 136, for example, highly detailed maps identifying the shape and elevation of roadways, lane lines, intersections, crosswalks, speed limits, traffic signals, buildings, signs, real time traffic information, or other such objects and information. Each of these objects such as lane lines or intersections may be associated with a geographic location which is highly accurate, for example, to 15 cm or even 1 cm. The map information may also include, for example, explicit speed limit information associated with various roadway segments. The speed limit data may be entered manually or scanned from previously taken images of a speed limit sign using, for example, optical-character recognition. The map information may include three-dimensional terrain maps incorporating one or more of objects listed above. For example, the vehicle may determine that another car is expected to turn based on real-time data (e.g., using its sensors to determine the current GPS position of another car) and other data (e.g., comparing the GPS position with previously-stored lane-specific map data to determine whether the other car is within a turn lane).

In another example, the vehicle may use the map information to supplement the sensor data in order to better identify the location, attributes, and state of the roadway. For example, if the lane lines of the roadway have disappeared through wear, the vehicle may anticipate the location of the lane lines based on the map information rather than relying only on the sensor data.

The vehicle sensors may also be used to collect and supplement map information. For example, the driver may drive the vehicle in a non-autonomous mode in order to detect and store various types of map information, such as the location of roadways, lane lines, intersections, traffic signals, etc. Later, the vehicle may use the stored information to maneuver the vehicle. In another example, if the vehicle detects or observes environmental changes, such as a bridge moving a few centimeters over time, a new traffic pattern at an intersection, or if the roadway has been paved and the lane lines have moved, this information may not only be detected by the vehicle and used to make various determination about how to maneuver the vehicle to avoid a collision, but may also be incorporated into the vehicle's map information. In some examples, the driver may optionally select to report the changed information to a central map database to be used by other autonomous vehicles by transmitting wirelessly to a remote server. In response, the server may update the database and make any changes available to other autonomous vehicles, for example, by transmitting the information automatically or by making available downloadable updates. Thus, environmental changes may be updated to a large number of vehicles from the remote server.

In another example, autonomous vehicles may be equipped with cameras for capturing street level images of roadways or objects along roadways.

Computer 110 may also control status indicators 138, in order to convey the status of the vehicle and its components to a passenger of vehicle 101. For example, vehicle 101 may be equipped with a display 225, as shown in FIG. 2, for displaying information relating to the overall status of the vehicle, particular sensors, or computer 110 in particular. The display 225 may include computer generated images of the vehicle's surroundings including, for example, the status of the computer, the vehicle itself, roadways, intersections, as well as other objects and information.

Computer 110 may use visual or audible cues to indicate whether computer 110 is obtaining valid data from the various sensors, whether the computer is partially or completely controlling the direction or speed of the car or both, whether there are any errors, etc. Vehicle 101 may also include a status indicating apparatus, such as status bar 230, to indicate the current status of vehicle 101. In the example of FIG. 2, status bar 230 displays "D" and "2 mph" indicating that the vehicle is presently in drive mode and is moving at 2 miles per hour. In that regard, the vehicle may display text on an electronic display, illuminate portions of vehicle 101, or provide various other types of indications. In addition, the computer may also have external indicators which indicate whether, at the moment, a human or an automated system is in control of the vehicle, that are readable by humans, other computers, or both.

In one example, computer 110 may be an autonomous driving computing system capable of communicating with various components of the vehicle. For example, computer 110 may be in communication with the vehicle's conventional central processor 160, and may send and receive information from the various systems of vehicle 101, for example the braking 180, acceleration 182, signaling 184, and navigation 186 systems in order to control the movement, speed, etc. of vehicle 101. In addition, when engaged, computer 110 may control some or all of these functions of vehicle 101 and thus be fully or merely partially autonomous. It will be understood that although various systems and computer 110 are shown within vehicle 101, these elements may be external to vehicle 101 or physically separated by large distances.

Systems and methods according to aspects of the disclosure are not limited to detecting any particular type of objects or observing any specific type of vehicle operations or environmental conditions, nor limited to any particular machine learning method, but may be used for deriving and learning any driving pattern with any unique signature to be differentiated from other driving patterns.

The sample values, types and configurations of data described and shown in the figures are for the purposes of illustration only. In that regard, systems and methods in accordance with aspects of the disclosure may include various types of sensors, communication devices, user interfaces, vehicle control systems, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the systems and methods as defined by the claims, the foregoing description of exemplary embodiments should be taken by way of illustration rather than by way of limitation of the disclosure as defined by the claims. It will also be understood that the provision of examples (as well as clauses phrased as "such as," "e.g.", "including" and the like) should not be interpreted as limiting the disclosure to the specific examples; rather, the examples are intended to illustrate only some of many possible aspects.

Unless expressly stated to the contrary, every feature in a given embodiment, alternative or example may be used in any other embodiment, alternative or example herein. For instance, any appropriate sensor for detecting vehicle movements may be employed in any configuration herein. Any data structure for representing a specific driver pattern or a signature vehicle movement may be employed. Any suitable machine learning methods may be used with any of the configurations herein.

What is claimed is:

1. A method for road scene understanding of vehicles in traffic, comprising
   capturing images of traffic with a camera coupled to a vehicle;
   generating a continuous model of occlusions with a continuous occlusion mode for traffic participants to enhance point track association accuracy without distinguishing between moving and static objects;
   applying the continuous occlusion model to handle visibility constraints in object tracks;
   combining the point track association and soft object track modeling to improve 3D localization accuracy; and
   modelling objects as translucent 3D ellipsoids whose opacity is maximum at the center and falls off towards the edges, further comprising modeling occupancy at location x corresponding to a traffic participant-centered at p as:

$$f_{occ}(x) = L(x; p, \Sigma)$$

where L(•) is a logistic given by $$L(x; p, \Sigma) = \frac{1}{1 + e^{-k(1-d(x,p))}},$$

with $d(x,p)=(x-p)^T\Sigma(x-p)$ being a Mahalanobis distance.

2. The method of claim 1, comprising applying physical insights to model occlusion relationships.

3. The method of claim 1, comprising applying an occupancy model for traffic participants (TPs) that treats the TPs as translucent objects reflected by an occupancy function.

4. The method of claim 1, comprising applying a reflection model for handling visible points.

5. The method of claim 1, comprising applying a transmission model for representing occlusions from all other TPs in a scene.

6. The method of claim 1, comprising applying models to determine soft assignments of point tracks to TPs.

7. The method of claim 1, comprising applying models to account for occlusion relationships in object detection scores.

8. The method of claim 1, comprising applying 3D localization using the energies from point tracks and detection models, along with energies that incorporate transition and collision constraints.

9. The method of claim 1, comprising defining an image formation model that accounts for reflection and transmission as a soft way to model occlusions.

10. The method of claim 1, comprising defining a reflection probability model that determines when a point is visible in the image.

11. The method of claim 1, comprising defining transmission probability model proposes a soft way to deal with occlusions due to intermediate objects in the path of a back-projected ray.

12. The method of claim 1, comprising defining a point tracks association energy to assign points in a soft fashion to various traffic participants.

13. The method of claim 1, comprising defining an object tracks energy to probabilistically adjust detection bounding boxes and scores to account for occlusions.

14. A method for road scene understanding of vehicles in traffic, comprising
capturing images of traffic with a camera coupled to a vehicle;
generating a continuous model of occlusions with a continuous occlusion mode for traffic participants to enhance point track association accuracy without distinguishing between moving and static objects;
applying the continuous occlusion model to handle visibility constraints in object tracks;
combining the point track association and soft object track modeling to improve 3D localization accuracy;
defining energy by a dot product between car orientation and tangent to a lane at a point; and
determining $$E_{lane}^{it} = \sum_{m \in M_{close}} (1 - \omega^i(t) \cdot \text{TAN}(L_m(k), p^i(t)))\Sigma_{L_m}(p^i(t))$$

where $M_{close}=\{m: \text{DIST}(L_m(k),p^i(t))<50\}$ is the set of nearby lanes and $$\Sigma_{L_m}(p^i(t)) = \frac{1}{1 + \exp(-q(w_{road} - DIST(L_m(k), p^i(t))))}$$

for a constant that represents a road width.

15. A method for road scene understanding of vehicles in traffic, comprising
capturing images of traffic with a camera coupled to a vehicle;
generating a continuous model of occlusions with a continuous occlusion mode for traffic participants to enhance point track association accuracy without distinguishing between moving and static objects;
applying the continuous occlusion model to handle visibility constraints in object tracks;
combining the point track association and soft object track modeling to improve 3D localization accuracy;
applying a localization framework that combines a plurality of energies along with collision and transition energies and size priors; and
determining prior energy $$E_{prior}^{it}=(B^i-\hat{B})^T\Sigma_{\hat{B}}^{-1}(B^i-\hat{B})$$

where $\hat{B}$ is mean TP dimensionns and $\Sigma_{\hat{B}}$ is a correspondence covariance matrix.

* * * * *